United States Patent
Christensen et al.

(10) Patent No.: US 6,795,568 B1
(45) Date of Patent: Sep. 21, 2004

(54) METHOD AND AN APPARATUS FOR SEVERING OR DAMAGING UNWANTED PLANTS

(75) Inventors: Svend Christensen, Holbaek (DK); Joergen Schou, Charlottenlund (DK); Torben Heisel, Aabenraa (DK)

(73) Assignee: Torsana Laser Technologies A/S, Kvistgaard (DK)

( * ) Notice: Subject to any disclaimer, the term of this patent is extended or adjusted under 35 U.S.C. 154(b) by 0 days.

(21) Appl. No.: 09/743,908

(22) PCT Filed: Jul. 15, 1999

(86) PCT No.: PCT/DK99/00405

§ 371 (c)(1),
(2), (4) Date: Mar. 14, 2001

(87) PCT Pub. No.: WO00/03589

PCT Pub. Date: Jan. 27, 2000

(30) Foreign Application Priority Data

Jul. 17, 1998 (DK) .................................. 1998 09523

(51) Int. Cl.$^7$ .................................................. G06K 9/00
(52) U.S. Cl. ................. 382/110; 382/190; 382/106; 382/108; 382/291; 250/559.29
(58) Field of Search ................................ 382/110, 191, 382/106, 108, 190, 291; 356/420; 250/226, 559.29; 111/105; 47/1.43; 362/122

(56) References Cited

U.S. PATENT DOCUMENTS

| | | | |
|---|---|---|---|
| 5,130,545 A | * 7/1992 | Lussier | 250/458.1 |
| 5,253,302 A | * 10/1993 | Massen | 382/110 |
| 5,296,702 A | * 3/1994 | Beck et al. | 250/226 |
| 5,439,490 A | * 8/1995 | Janus | 47/1.01 R |
| 5,528,049 A | * 6/1996 | Callahan | 250/493.1 |
| 5,841,883 A | * 11/1998 | Kono et al. | 382/110 |
| 5,854,063 A | * 12/1998 | Li et al. | 435/287.1 |
| 5,901,237 A | * 5/1999 | Conrad | 382/110 |
| 5,999,650 A | * 12/1999 | Ligon | 382/191 |
| 6,014,451 A | * 1/2000 | Berry et al. | 382/110 |
| 6,178,253 B1 | * 1/2001 | Hendrickson et al. | 382/110 |
| 6,466,321 B1 | * 10/2002 | Satake et al. | 356/402 |
| 6,573,512 B1 | * 6/2003 | Lucia et al. | 250/458.1 |

FOREIGN PATENT DOCUMENTS

| | | |
|---|---|---|
| DE | 4039797 A1 | 9/1991 |
| DE | 4339329 A1 | 5/1995 |
| DE | 19530356 A1 | 4/1997 |
| DE | 19627139 A1 | 1/1998 |
| WO | WO94 02812 | 2/1994 |
| WO | WO97 17830 | 5/1997 |

* cited by examiner

Primary Examiner—Bhavesh M. Mehta
Assistant Examiner—Barry Choobin
(74) Attorney, Agent, or Firm—Birch, Stewart, Kolasch & Birch, LLP

(57) ABSTRACT

The present invention relates to a method and an apparatus capable of severing or damaging unwanted plants without using herbicides. The present invention relates in particular to an apparatus and a method for differentiating between different types of plants to allow identification of, and thus selective elimination or treatment of, individual plants. According to the present invention, the positioning of and the output power of at least one light generating means is controlled on the basis of information from an image recognition system which is capable of differentiating beween different plants.

18 Claims, 1 Drawing Sheet

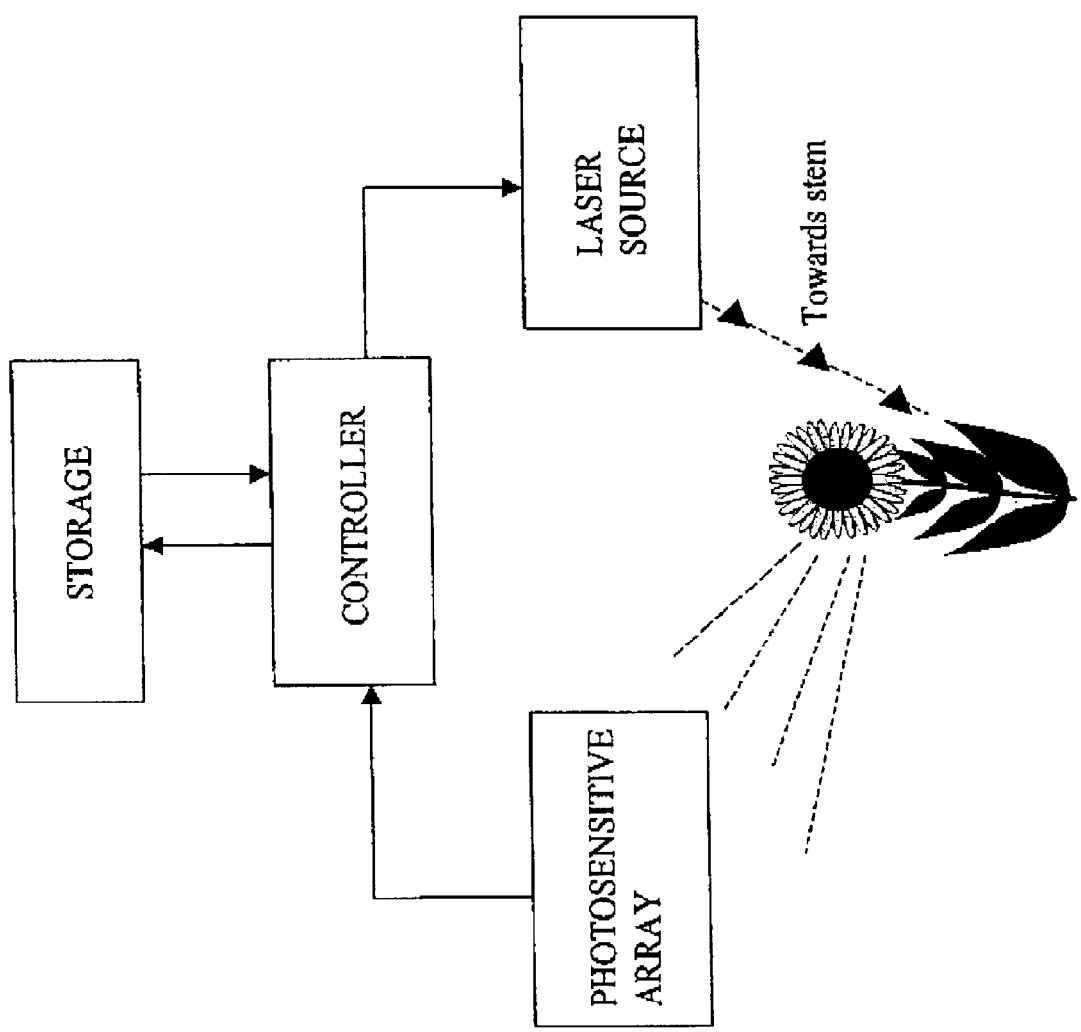

METHOD AND AN APPARATUS FOR SEVERING OR DAMAGING UNWANTED PLANTS

This application is the national phase under 35 U.S.C. § 371 of PCT International Application No. PCT/DK99/00405 which has an International filing date of Jul. 15, 1999, which designated the United States of America.

FIELD OF THE INVENTION

The present invention relates to a method and an apparatus for severing or damaging an unwanted plant by e.g. combining an optical image recognition system capable of differentiating between different types of plants and a light generating means for exposing the plant to electromagnetic radiation.

DESCRIPTION OF RELATED ART

In U.S. Pat. No. 5,296,702, a system is provided for plant recognition. The system disclosed in U.S. Pat. No. 5,296,702 comprises a targeting system for applying herbicides to individual plants so as to reduce the use of herbicides. The system is capable of differentiating between different plants so that only a predetermined type of plants, e.g. an unwanted plant, will be exposed to herbicides.

A disadvantage of the system disclosed in U.S. Pat. No. 5,296,702 is that the use of herbicides is not avoided.

SUMMARY OF THE INVENTION

It is an object of the present invention to provide a method and an apparatus capable of severing or damaging unwanted plants without using herbicides.

In accordance with the present invention, an apparatus and a method are provided for differentiating between different types of plants to allow identification of, and thus selective elimination or treatment of, individual plants. In the present invention, the positioning of and the output power of at least one light generating means is controlled on the basis of information from an image recognition system which is capable of differentiating between different plants.

The image recognition system provides an output signal for each different plant being imaged and identified. A controller analyses the output signal from the image recognition system, and assuming the imaged plant is a utility plant, no action is taken with respect to the plant. In the case where an unwanted plant has been identified, information relating to the position, and optionally the type of plant, is transmitted to a control system. The control system directs at least one light beam, such as with a plant-dependent intensity, toward the unwanted plant in order to damage or actually sever the plant. Alternatively all plants not recognised as utility plants may be radiated.

An advantage of the present invention is that the use of herbicides is completely avoided.

A further advantage of the present invention is related to the fact that it may operate under a wide variety of weather conditions including windy conditions, bright sunlight, artificial illumination or even total darkness. Especially the operability under windy conditions is an advantage, since the use of herbicides under such conditions normally results in over—spay.

The present invention brings the farmer close the goal where:

no unwanted plants are over-looked, and the use of herbicides is completely avoided More specifically, in a first aspect the invention relates to an apparatus for severing or damaging plants, the apparatus comprising:

means for generating image data representing at least part of a plant, means for analysing the image data and for determining whether the plant is one of a number of predetermined plants or types of plants, and, from that determination, whether the plant is to be severed or damaged, severing or damaging means adapted to generate and direct a beam of electromagnetic radiation toward the plant in a manner so that at least part of the plant is severed or damaged.

As will be clear from the following, it may be over-kill to actually fully sever the unwanted plants, as a thermal damaging thereof may retard the growth sufficiently for the utility plants to "out grow" the unwanted plants and thereby prevail. Thermal damaging may be a local heating of a sufficiently large or vital part of the plant. A vital part of the plant is the stem, and a local heating—such as one leading to cell destruction—of a part thereof will prevent or reduce the liquid led from the root to the leaves which again will kill or retard the plant. This will be described in more detail further below.

BRIEF DESCRIPTION OF THE DRAWINGS

The FIGURE shows the apparatus for severing or damaging plants.

In the present context, a predetermined plant or a predetermined type of plant may be typical weeds. However, for use in specific crops, different plants or types of plants not normally considered as weeds may be unwanted and required removed in order for the actual plants of the crop to prevail. Therefore, the plants or types of plants may very well differ depending on the actual plants that are desired on the ground.

Alternatively, the predetermined plants or types of plants may be the actual utility plants desired on the ground. In that situation, plants not falling into that category may be taken as unwanted and sought damaged or severed.

In order for the apparatus to be able to cover more ground than that analysed in a stationary image taken by the image generating means, it is preferred that the apparatus further comprises means for translating or moving the generating means and the severing or damaging means along a surface. Normally, this surface will be the surface of the ground or a field where utility plants are grown and where e.g. weeds are to be removed at least during germination and sprouting until the leaves of the utility plants are sufficiently large.

In this manner, the apparatus or parts thereof will move through the field and deal with the unwanted plants therein area by area.

Often, in the fields, the utility plants are positioned at predetermined positions in order for the field to be optimally used and in order to ensure that each utility plant has sufficient space. Naturally, this knowledge may be used by the analysing system in that e.g. plants outside these predetermined positions may simply be determined as unwanted plants and therefore severed or damaged. Otherwise, the analysing system may use a parameter relating to the distance from a plant being analysed to one or more of the predetermined positions (with suitable tolerances)—the farther away, the larger a possibility of the plant being analysed being an unwanted plant.

Also or optionally, the apparatus may further comprise:

means for determining a relative position of the severing and damaging means, the plant to be severed or damaged, and one or more other plants in the image data and which are not to be damaged or severed, means for determining a relative position of the severing or damaging means, the plant to be severed or damaged, and the one or more other plants where an at least substantially straight line is present between the severing or damaging means and the plant, the line not intersecting the other plants to any significant degree.

As the severing or damaging means operate using electromagnetic radiation, no utility plants should be in the way when irradiating the unwanted plant. However, a slight irradiation of a utility plant may be tolerated. Also, it should be remembered that especially when the image data relate to an image taken from above and when the radiation is directed substantially horizontally, parts of the image data relating to leaves will, in fact, not be irradiated due to the stem of the plant being the target and not being in that position.

Preferably, the determined relative position is also one wherein a distance from the plant and each of the one or more plants, in a direction from the severing or damaging means to the plant, exceeds a predetermined distance. This predetermined distance may be determined so that radiation impinging on a plant at that distance will not or only slightly damage that plant. Normally, this distance will depend on the intensity and degree of focussing of the beam.

Also, the actual direction may "vary" slightly, if the beam is scanned—and in accordance with the width of the beam, if this is wide compared to the width of the impinged part of the plant.

Preferably, the moving means are adapted to move the severing or damaging means in order to obtain the determined relative position, and preferably the severing or damaging means are adapted to direct the beam toward the plant—in order for the severing or damaging means to sever or damage the plant and not to any significant degree the other plants.

It should be noted that the actual plant to be severed or damaged needs not be represented in the image data at the point in time for severing or damaging, as the apparatus may comprise means for determining the speed, direction, etc. required in order to determine when the predetermined position has been reached.

When the movement of the apparatus or parts thereof is along a predetermined direction or path, preferably the predetermined position is selected (if several positions are possible) along that direction or path.

In order to obtain a sufficient severing or damaging of the plant, the intensity of the beam should be selected in accordance with the time available for the irradiation. Preferably, a relatively large part or diameter of the plant—and especially the stem thereof—is irradiated and damaged/severed. If the beam has a width comparable to that of the irradiated part of the plant, a stationary beam may accomplish that. If a higher beam intensity is required, it is preferred that the means for directing the beam toward the plant are adapted to scan the beam over a predetermined area. In this manner, a smaller energy may be required at the expense, of a larger irradiating/scanning time.

Preferably, in order to optimally damage the unwanted plant, the stem thereof is irradiated, whereby the scanning needs only encompass the position of the stem. Naturally, this scanning brings about the "variation" in the above direction when ensuring that no utility plants are damaged by the scanning.

It has been found that different unwanted plants require different intensities in order to be sufficiently damaged or actually severed. However, generally, when the beam is focussed to a beam waist of 10 $\mu$m to 1 mm, such as 100 $\mu$m to 500 $\mu$m, has been found sufficient to sever or damage most unwanted plants sufficiently. Consequently, the severing or damaging means may comprise means for setting the size and position of the beam waist as well as the actual intensity of the beam depending on information from the generating means as to the distance to the unwanted plant, the position thereof (such as of the stem thereof), and as to the type and/or size thereof.

Also, it is contemplated that different unwanted plants or types of plants may have different damaging or severing characteristics so that it may be preferred that these are irradiated with different wavelengths.

Preferably, the generating means are adapted to generate image data relating to an image of the plant from a direction at least partly from above the plant, and the severing or damaging means are adapted to direct the beam along a direction being at least substantially horizontal. In this manner, the image data comprise data relating to the leaves of the plants while the radiation may be directed toward the stems thereof.

Due to the fact that the stem is normally the most vulnerable part of the plant—or the easiest place to severely damage or sever the plant, and that the image data preferably relate to the leaves thereof, the analysing means are preferably adapted to estimate from the image data of the plant a position of a stem of the plant to be severed or damaged, and wherein the severing or damaging means are adapted to direct the beam toward the estimated position of the stem—optionally with a scanning thereof.

Naturally, a number of ways exist of determining whether image data relate to one plant or type of plant or another. However, preferably the analysing and determining means are adapted to:

from the image data, deriving one or more features relating to a shape, structure, and/or colour of at least part of a leaf of the plant, determine, on the basis of the derived feature(s), whether the plant is one of the number of predetermined plants or types of plants.

For example, a feature may be derived from the shape or pattern of the outer contour of the leaf or the structure of the midribs and veins of the leaf. Also the size thereof or the relative positions of different leaves of the same plant may provide information as to the type thereof.

In a second aspect, the invention relates to a method of severing or damaging plants, the method comprising:

generating image data representing at least part of a plant, analysing the image data and determining whether the plant is one of a number of predetermined plants or types of plants, and, from that determination, whether the plant is to be severed or damaged, and generating and directing a beam of electromagnetic radiation toward the plant in a manner so that the at least part of the plant is severed or damaged.

Preferably, the generating means and the severing or damaging means are moved or translated along a surface.

As described above, the method further preferably comprises:

determining a relative position of the severing and damaging means, the plant to be severed or damaged, and one or more other plants in the image data and which are not to be damaged or severed, determining a relative position of the severing or damaging means, the plant to be severed or damaged, and the one or more other where an at least substantially straight line is present between the severing or damaging means and the plant, the line not intersecting the other plants to any significant degree.

Most often, the relative position is also one wherein a distance from the plant and each of the one or more plants, in a direction from the severing or damaging means to the plant, exceeds a predetermined distance.

Therefore, normally, the moving means would then move the severing or damaging means in order to obtain the determined relative position, and wherein the severing or damaging means direct the beam toward the plant.

Due to the power requirements of such a system, the step of directing the beam toward the plant preferably comprises scanning the beam over a predetermined area.

As described above, the generating means may generate image data relating to an image of the plant from a direction at least partly from above the plant, and wherein the severing or damaging means direct the beam along a direction being at least substantially horizontal.

Also, the analysing means would normally estimate from the image data of the plant, a position of a stem of the plant to be severed or damaged, and the severing or damaging means would direct the beam toward the estimated position of the stem.

Even further, the analysing and determining means may further perform the step of:

from the image data, derive one or more features relating to a shape, structure, and/or colour of at least part of a leaf of the plant, determine, on the basis of the derived feature(s), whether the plant is one of the number of predetermined plants or types of plants.

The invention will be more fully understood in light of the following detailed description of preferred embodiments of the invention. The following description is meant to be illustrative only and not limiting. Alternative embodiments of the invention will be obvious in view of the following disclosure.

The preferred image recognition system comprises an optical imaging system for projecting an image onto an array of photosensitive elements, such as a charge coupled device (CCD), so as to generate an electrical representation of the object to be imaged. The image recognition system is mounted to provide a top-down view of the object to be imaged.

The electrical representation of the object is analysed by a controller electrically linked to the photosensitive elements. For identification purposes, the controller is also linked to a storage unit where information relating to the relevant plants is stored. The image recognition system may operate in one of two modes:

1. In the first mode of operation, the image recognition system matches the plants in the image with information stored in the storage unit to identify unwanted plants, where the apparatus subsequently severs or damages these plants.
2. In a second and different mode, the image recognition system identifies utility plants by comparing the imaged plants with information stored in the storage unit. The apparatus subsequently servers or damages the other plants in the image.

In the process of recognising plants, the edge structure of leaves may be used. Alternatively, the shape of leaves and the fine structure of leaves may also be used in the identification process of a specific plant. Finally, the colour of leaves may be used in the identification of the plants.

It is evident that identification of a given plant from its colour may be problematic, since the colour of the reflected light from the leaves is dependent on the colour of the incident light, i.e. the colour of the light reflected from a leaf is different in daylight compared to the colour reflected by the same leaf in artificial illumination. Thus, identification of plants via colour is preferably performed using artificial illumination. Otherwise, a daylight calibration would be preferably on the basis of which the apparatus will be able to adapt to changes in the illumination.

Both visible light, near-infra red (NIR) light and ultra-violet light may be used as artificial illumination. If a silicon based CCD is used, both NIR light and visible light may be detected. Thermal imaging may provide additional information making the identification of plants more reliable.

As mentioned above, one manner of identifying an unwanted plant may be seen from U.S. Pat. No. 5,296,702.

When an unwanted plant has been positively identified by the image recognition system and the position of its stem has been determined, a signal is transmitted to the control system so as to direct a light beam in the direction of the unwanted plant in order to server or damage a part of the unwanted plant.

Light generating means may be gas laser, such as argon-ion lasers or preferably $CO_2$ lasers. However, more suitable may be solid state lasers, such as semiconductor lasers or a Nd: YAG laser. Such semiconductor lasers may be GaAs-based or GaInP-based lasers. The laser beam may be either a continuum wave or pulsed laser beam where at least one laser pulse is transmitted towards a specific plant. Wavelengths the range from ultra-violet (190 nm) to the far-infra red (10600 nm) may be applied. Especially at the shorter wavelengths, photo-chemistry is likely to take part in the damaging or severing of the plant.

When the data relating to the plants relate to the leaves thereof, the optical axes of the generated light beams are preferably at an angle to the optical axis of the image recognition system. However, in an alternative embodiment, the plants may be identified and classified by data relating to their stems. In that situation, also the image recognition system may be directed at least substantially horizontally.

The choice of radiation wavelength may be related to the choice of mechanism responsible for the damage or severing of an unwanted plant. In the infrared, this mechanism may be a local thermal process in the stem of the unwanted plant mainly due to heating of water present in the stem. In order to obtain a sufficient power density, the laser beam is focussed to a spot size with a diameter smaller than 1 mm, such as 100 to 500 $\mu$m.

In the infrared region, the water in the stem may be efficiently heated by selecting a radiation wavelength close to the water absorption peaks. Water absorption peaks are distributed over a large range. The range from 800 nm to 10600 nm exhibits a plurality of absorption peaks. By matching the radiation wavelength to one of the water absorption peaks, the efficiency of especially the initiation of a thermal process is significantly increased.

Also, a photochemical process may be used for damaging the plant.

The positioning of the laser beam is preferably performed using movable mirrors. The movement may comprise a rotation or translation or both, so as to direct the laser in a direction determined by the image recognition system.

Suitable means for provided movements of mirrors may be electrical motors, such as servo motors or stepping motors, or piezo-electric elements.

The depth resolution of the laser system is determined by the length of the beam waist. Movable optical elements, such as lenses, mirrors, or prisms, may be applied in order to be able to adjust the width and length of the beam waist for different purposes.

The width of the beam waist is adjusted so as to obtain the required power density for a specific application. It is estimated that the required exposure of the plant is in the range of 0.01–25 $J/mm^2$, such as 0.1–1 $J/mm^2$.

Adjustment of the length of the beam waist enhances the selectivity of the system, since the power density is significantly increased within the beam waist. This can be used in the situation where a unwanted plant or a utility plant has been identified, and its position has been determined by the image recognition system. The beam waist of the laser beam is then adjusted so that the position of the identified an unwanted plant falls within the beam waist.

By moving the optical elements, the beam waist may be moved along the beam path, whereby selectivity along the beam path is achieved. This, however, may not be required where the distance between e.g. the rows of utility plants is well defined compared to the focal depth.

The longer the beam waist the longer the distance will be within which plants will be damaged or severed. If the optics so allow, it may be preferred that the beam waist is quite short—but positioned at the right distance from the laser—so that the beam disperses a short distance therefrom to a degree so that other plants in that direction are not affected by the beam. Also, the more focussed the beam, the lower energy is required in order to damage or sever the plant.

When an unwanted plant has been identified by the image recognition system, the exact position of the stem is not always known since leaves may limit the top field of view of the image recognition system. Therefore, if the stem cannot be precisely located, the image recognition system defines an area, wherein the stem is located within a predetermined accuracy. The laser beam may then firstly be directed toward the centre of this area and subsequently scanned horizontally to cover the whole area.

This determination of the position of the stem may most easily be chosen as a middle area of the area covered by leaves of the plant. A more sophisticated method is one taking into account that most leaves are elongate and connected to the stem at one end. Thus, by analysing the direction of the leaves may provide a better estimate of the position of the stem. The smaller an area within which the stem should be positioned, the more precise and the quicker a severing or damaging is obtained.

When using high power densities, the stem of the weed breaks when the laser beam hits the stem. After exposure, the image recognition system may then return the to the site of the plant to confirm whether the light exposure was sufficient for severing. If the stem is broken, no further action is taken in respect to this specific plant. If the light exposure had insufficient impact on the plant, steps toward an additional exposure is taken. After an additional exposure, the image recording system checks whether the additional exposure had sufficient impact on the plant.

A further advantage of the present invention is concerned with the fact that the image recognition system may delay the light exposure until the light path from the position of the laser to the position of the plant is free.

Due to the fact that the image data will relate to a two-dimensional area, the identified unwanted plant may be positioned so that irradiation from the actual position of the laser is not possible, as it might also damage a utility plant in the process. This may be due to the utility plant being positioned between the laser and the unwanted plant or that it is positioned too close to (such as directly behind) the unwanted plant in order to ensure that it is not irradiated during scanning of the laser or due to the unwanted plant severing and the laser beam travelling past it and on to the utility plant.

Thus, irradiation of the unwanted plant is obtained by moving the laser in relation to the unwanted plant and the utility plant(s) so that the laser may directly irradiate the unwanted plant. Irradiation requires a direct open path from the laser to the unwanted plant. However, it also requires a certain space directly and substantially directly behind the unwanted plant in order to give space to the scanning laser beam—optionally also directly behind the position of a severed unwanted plant.

This relative positioning may be determined from the image data. It should be noted that the unwanted plant needs not be in the image data at the point in time of irradiation, if the apparatus comprises means for determining when the relative positioning has been obtained.

This situation may be seen if, e.g., the unwanted plant is only "accessible" from a direction opposite to those from which the laser is adapted to irradiate the plant. In that situation, a second laser may be provided which is able to irradiate the plant from a different direction. Also, this may provide an irradiation from two sides of unwanted plants that will further enhance the probability of sufficiently damaging or severing the unwanted plants.

During operation, the present invention may be mounted on a tractor that is man-driven through the field where growth of weed is to be controlled. In another configuration, the present invention may be mounted on a computer-controlled vehicle, such as one navigating via the Global Positioning System (GPS) or along rows of plants in the field.

What is claimed is:

1. An apparatus for severing or damaging plants, the apparatus comprising:

means for generating image data representing at least part of a plant, means for analyzing the image data and for determining whether the plant is one of a number of predetermined plants or types of plants, and, from that determination, whether the plant is to be severed or damaged, severing or damaging means adapted to generate and direct a beam of electromagnetic radiation toward the plant in a manner so that at least part of the plant is severed or damaged by the effect of the electromagnetic radiation, wherein the analyzing means are adapted to estimate from the image data of the plant a position of a stem of the plant to be severed or damaged, and wherein the severing or damaging means are adapted to direct the beam of electromagnetic radiation toward the estimated position of the stem.

2. An apparatus according to claim 1, further comprising means for translating or moving the generating means and the severing or damaging means along a surface, such as the ground or a field.

3. An apparatus according to claim 2, further comprising means for determining a relative position of the severing and damaging means, the plant to be severed or damaged, and one or more other plants in the image data and which are not to be damaged or severed, and means for determining a relative position of the severing or damaging means, the plant to be severed or damaged, and the one or more other plants where an at least substantially straight line is present between the severing or damaging means and the plant, the line not intersecting the other plants to any significant degree.

4. An apparatus according to claim 3, wherein the relative position is also one wherein a distance from the plant and each of the one or more other plants, in a direction from the severing or damaging means to the plant, exceeds a predetermined distance.

5. An apparatus according to claim 3, wherein the moving means are adapted to move the severing or damaging means in order to obtain the determined relative position, and wherein the severing or damaging means are adapted to direct the beam toward the plant.

6. An apparatus according to claim 1, wherein the means for directing the beam toward the plant are adapted to scan the beam over a predetermined area.

7. An apparatus according to claim 1, wherein the generating means are adapted to generate image data relating to an image of the plant from a direction at least partly from above the plant, and wherein the severing or damaging means are adapted to direct the beam along a direction being at least substantially horizontal.

8. An apparatus according to claim 1, wherein the analyzing and determining moans arc adapted to:

from the image data, deriving one or more features relating to a shape, structure, and/or color of at least part of a leaf of the plant, and determine, on the basis of the derived feature(s), whether the plant is one of the number of predetermined plants or types of plants.

9. A method of severing or damaging plants, the method comprising:

providing means for generating image data representing at least part of a plant, providing means for analyzing the image data and determining whether the plant is one of a number of predetermined plants or types of plants, and, from that determination, whether the plant is to be severed or damaged, providing means for generating and directing a beam of electromagnetic radiation toward the plant in a manner so that at least a part of the plant is severed or damaged by the effect of the electromagnetic radiation, wherein the provided analyzing means estimate from the image data of the plant, a position of a stem of the plant to be severed or damaged, and wherein the severing or damaging means direct the beam of electromagnetic radiation toward the estimated position of the stem.

10. A method according to claim 9, further comprising translating or moving the generating means and the severing or damaging means along a surface, such as the ground or a field.

11. A method according to claim 10, further comprising determining a relative position of the severing and damaging means, the plant to be severed or damaged, and one or more other plants in the image data and which are not to be damaged or severed, and determining a relative position of the severing or damaging means, the plant to be severed or damaged, and the one or more other plants where an at least substantially straight line is present between the severing or damaging means and the plant, the line not intersecting the other plants to any significant degree.

12. A method according to claim 11, wherein the relative position is also one wherein a distance from the plant and each of the one or more plants, in a direction from the severing or damaging means to the plant, exceeds a predetermined distance.

13. A method according to claim 11, wherein the moving means move the severing or damaging means in order to obtain the determined relative position, and wherein the severing or damaging means direct the beam toward the plant.

14. A method according to claim 9, wherein the step of directing the beam toward the plant comprises scanning the beam over a predetermined area.

15. A method according to claim 9, wherein the generating means generate image data relating to an image of the plant from a direction at least partly from above the plant, and wherein the severing or damaging means direct the beam along a direction being at least substantially horizontal.

16. A method according to claim 9, wherein the analyzing and determining means further perform the step of:

from the image data, derive one or more features relating to a shape, structure, and/or color of at least part of a leaf of the plant, and determine, on the basis of the derived feature(s), whether the plant is one of the number of predetermined plants or types of plants.

17. An apparatus according to claim 1, wherein the beam of electromagnetic radiation comprises a laser beam.

18. A method according to claim 9, wherein the beam of electromagnetic radiation comprises a laser beam.

* * * * *